United States Patent Office 3,775,379
Patented Nov. 27, 1973

3,775,379
WET STRENGTH RESINS AND PROCESS FOR MAKING SAME FROM UNSATURATED DI-ACID ANHYDRIDE, POLYALKYLENE POLY-AMINE, ALKYLENE DIAMINE, SATURATED ALIPHATIC DIACID AND EPICHLOROHYDRIN
Robert W. Hausslein, Lexington, Mass., and Hugh E. McCollum, Kew Gardens, N.Y., assignors to Amicon Corporation, Lexington, Mass.
No Drawing. Continuation-in-part of abandoned application Ser. No. 809,958, Mar. 24, 1969. This application May 13, 1971, Ser. No. 143,256
Int. Cl. C08g 20/38; D21d 3/00
U.S. Cl. 260—78 SC                           10 Claims

ABSTRACT OF THE DISCLOSURE

An improved polyamino polyamide polymer is formed by reacting an acid anhydride with an alkylene amine having a secondary amino group between alkylene chains to form an amine acid organamide, and thereafter polymerizing the amine acid organamide. The resultant polyamino polyamide polymer is reacted with epihalohydrin and, optionally, subsequently crosslinked.

---

This application is a continuation-in-part of our co-pending U.S. patent application, Ser. No. 809,958, filed March 24, 1969, now abandoned.

It has been known in the prior art to react epihalohydrins, especially epichlorohydrin, maleic acid (and other such dibasic acids) and certain polyalkylene amines to form wet-strength resins, clarification aids, and other such water-soluble polymeric materials. Some of these materials are disclosed in such patents as U.S. Pat. No. 2,926,154 and No. 3,125,552. The former patent relates to a process comprising a first reaction of saturated dicarboxylic acids with a polyalkylene polyamine followed by further reaction with epichlorohydrin to give a final water-soluble polymeric product. The latter patent discloses a process comprising a first reaction of an unsaturated dicarboxylic acid with a polyalkylene polyamine followed by further reaction with epichlorohydrin to give a final water-soluble polymeric product. Of all such dicarboxylic acids known in the art the most desirable from an economic point of view is usually maleic acid. However, resins made from the direct condensation of maleic acid with polyalkylene polyamines are less than completely satisfactory both in effectiveness of wet strength resins and/or flocculants prepared therefrom, and in appearance, because the relatively high temperatures needed to promote the required reactions result in some polymer degradation during synthesis of the resins. Consequently, the products have both low viscosity and poor color characteristics. This poor color is not only aesthetically displeasing, but it also adversely affects the color of reaction products prepared from the poorly-colored polymeric product and some of the ultimate products which are coated with such polymer products.

Therefore, it is an object of the present invention to provide a process for making improved polymers useful as flocculating agents and wet-strength resins which have both high molecular weight and extremely good color characteristics.

Another object of the invention is to provide said improved novel water-soluble resins by a process utilizing very inexpensive raw materials.

Still another object of the invention is to provide resins suitable for use as wet-strength resins and/or as flocculating agents.

Another object of the invention is to provide paper of good wet-strength which paper comprises the resin formed by crosslinking the above-identified water-soluble resins.

Other objects of the invention will be obvious to those skilled in the art on reading the instant specification.

The above objects have been substantially accomplished by utilizing a reaction product of an inexpensive anhydride such as maleic anhydride with amine including an alkylene polyamine having a secondary amino group between alkylene chains such as diethylene triamine to form a polymerizable amine acid organamide compound. In particular, the amine is selected from the class consisting of: (a) alkylene amines of the formula $NH_2(R_2NH)_xH$ where R is an alkylene group having from 2 to 4 carbon atoms and $x$ is an integer from 2 to 6; and (b) mixtures of alkylene amines (a) with alkylene amines of the formula $NH_2R_3NH_2$, in which $R_3$ is an alkylene group having from 2 to 6 carbon atoms in which mixtures at least 20% of the total amino groups are secondary amino groups. The reaction product is formed by a displacement reaction between equimolar parts of an unsaturated anhydride and amine according to the reactions:

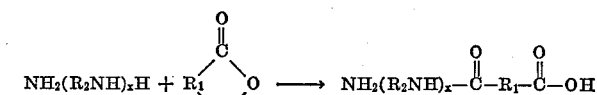

(1)

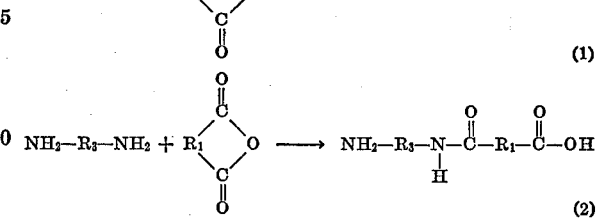

(2)

where $R_1$ is an unsaturated divalent hydrocarbon group contributed by the anhydride. Most advantageously $R_1$ comprises up to about 8 carbon atoms.

Once formed, this unsaturated polymerizable amine acid organamide compound is heated to promote the formation of a polyamino polyamide polymer comprising units of the formula:

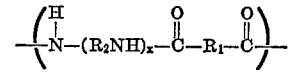

either alone or in admixture with units of the formula:

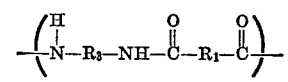

wherein $R_1$, $R_2$ and $R_3$ are as defined above. The polymer chain advantageously includes at least about 20 units.

However, in addition to the amine acid organamide as defined above, the polymerizable reactant mix may also contain other alkylene amines $NH_2$—$R_3$—$NH_2$, and discarboxylic acids having hydrocarbon chains between acid groups, so long as the amount of amine acid organamide in the mix is sufficient to provide a polymer in which at least 25% of the repeating units are of the formula

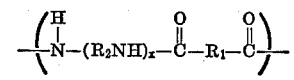

Such condensation polymers, when formed by dissolving the amine acid organamide in an inert liquid reaction medium and thereupon completing the condensation at a temperature below about 170° C. (preferably below about 150° C.), are of good color ranging from straw-colored to orange-red.

The polyamino polyamide condensation polymer is then reacted with an epihalohydrin (most advantageously epichlorohydrin, but epibromohydrin and epiiodohydrin may also be used) until the viscosity of the resultant product, in 10% aqueous solution, is between about 100 and about 2000 cps. The resultant product is useful as a flocculant and can be further reacted through a residual unsaturation therein to provide a variety of tailored resins useful in particular applications. In particular, the product may be crosslinked simply by heating, successively, for at least 2, and preferably 2 to 4 minutes at 180° to 300° F., and for at least 30, and preferably 30 to 90 minutes at 80° to 130° F.

This reaction product, formed by reaction of epihalohydrin and the condensation polymer is believed to have pendant epihalohydrin-derived units attached to the secondary amino nitrogen atoms (not to the amido groups) of the repeating units. For example, when the repeating unit is

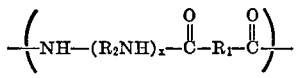

$R_2$ is derived from diethylene triamine, and the subsequent reaction is with epichlorohydrin, the formula of the product is believed to be:

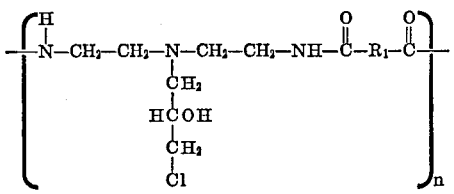

Among the preferred acid anhydrides for forming the amine acid organamides are unsaturated anhydrides such as the anhydrides of maleic acid and citraconic acid, and itaconic acid, with maleic acid being particularly preferred. In general, the amine compound must be one which dissolves in a solvent also capable of dissolving the anhydride compound, which solvent should be substantially non-solvating with respect to the anhydride amine reaction product thereof. Among the useful secondary amine group-containing amines are diethylene triamine, triethylene tetramine, tetraethylene pentamine, dipropylenetriamine and the like. In general, alkylene amines containing at least two primary amine groups and at least one secondary amine group are useful. Where a mixture of amines is used, the other useful amine compounds (which contain only primary amines) include 1,3-propylene diamine, 1,4-butylene diamine, 1,5-pentylene diamine, 1,6-hexane diamine and the like. As has been indicated above, in such a mixture of amines, at least 20% of all amino nitrogens present must be secondary amino nitrogens in order to provide sufficient secondary amino sites for the ultimate reaction of the condensation polymer to be formed from the amine acid organamides with epihalohydrin molecules, and yet provide sufficient residual secondary amino groups to facilitate the crosslinking of the epihalohydrin-condensation polymer by a further reaction as will be described below. Thus, for example a mixture of equal molar portions of 1,6 hexanediamine and diethylene triamine would be a suitable amine reactant mix.

The anhydride and amine are preferably reacted under anhydrous conditions in an inert liquid medium such as benzene, toluene, or other such solvent. Temperature of the reaction system is conveniently maintained from about 20 to 35° C., but the temperature may be lower where time of reaction is not unduly prolonged and may be higher provided temperatures sufficiently high to initiate any substantial decomposition of the reactants and/or product are avoided. An oxygen-free atmosphere is preferably maintained over the reaction mix to minimize the formation of oxidative by-products which may be, or form, colored bodies. The reaction proceeds to form the amine acid organamide according to the Equation 1 set forth above.

To form the polyamino polyamide compound, there may be included, with the aforesaid amine acid organamide, discarboxylic acids having hydrocarbon chains between acid groups such as adipic acid, succinic acid, itaconic acid and the like along with a corresponding equimolar amount of an amine such as the heretofore described primary and secondary alkylene amines. However, these materials should be added only in such quantity as to assure that at least about 25% by weight of the repeating units in the final product are from the amine acid organamide. In preferred embodiments, the molar proportion of said amine acid organamide, and of the last said amine and acid is approximately 2:3:3 respectively.

The reaction of epihalohydrin and the resultant polyamino polyamide polymer is suitably carried out in an aqueous medium preferably in the absence of oxygen which tends to promote the formation of color-imparting by-products. Most advantageous ratios of reactants are between 0.5 to 2 mols of epihalohydrin per mole of secondary amino groups on the polymer. Temperatures from about 40° C. to 85° C. are most desirable for carrying out the reaction; but, in general, the reaction may be carried out at any convenient temperature if it is not so low as to unduly prolong the time necessary to achieve a desirable product nor so high that it promotes chemical or thermal decomposition of reactants or product. The total reaction time should be kept under about 3 hours, preferably under two and one half hours at 55 to 65° C., to achieve the best viscosity characteristics.

A 10% aqueous solution of epichlorohydrin-polyamino polyamide reaction product should have a viscosity of from about 100 to about 2000 cps. as measured on a Brookfield LVT viscometer with a No. 2 spindle at 30 r.p.m. In general, the materials exhibiting a viscosity of above 1000 cps. are better as water clarification agents and those exhibiting a viscosity of below 1000 cps. are better as wet-strength resins for use in paper manufacture.

The epichlorohydrin-polyamino polyamide reaction product is formed by the addition of epichlorohydrin molecules to the secondary amino nitrogens along the backbone. However, when the polymer is to be used as a wet-strength resin, some subsequent crosslinking is required to effect the necessary crosslinking on the paper surface. To achieve this crosslinking, some secondary amino nitrogens must remain after the epichlorohydrin-polyamino polyamide reaction product has been formed. In practice this is easily achieved by providing at most a mole of epichlorohydrin for each mole of secondary amino nitrogen originally on the polyamino polyamide. Since some of the epichlorohydrin tends to hydrolyze in the aqueous reaction medium and thereby becomes incapable of reacting with available secondary amino groups, residual unreacted secondary amino groups will remain. Moreover, it is believed that the tertiary amino nitrogens to which the epichlorohydrin residues are attached are capable of combining to some extent with other epichlorohydrin molecules, the amino nitrogens assuming the quaternary form.

In practice, crosslinking is usually carried out by heating a paper treated with the uncrosslinked polyamino-polyamide-epichlorohydrin reaction product for 2 to 4 minutes at 180° to 300° F., and for 30 to 90 minutes at 80° to 130° F. from about 0.1 to about 2.5 percent, based on the weight of dry paper, of resin is used to impart wet strength to cellulosic paper. Most advantageously, 0.5 to 2.0% by weight of resin is used.

Optimum storage conditions for the products of the invention are at from about 6 to 8% aqueous solution at a pH of from about 5 to 6.

The novel products of the invention, whether or not crosslinked, are characterized by excellent color characteristics and also by a high molecular weight evidenced by their ability to contribute a relatively high viscosity in aqueous solution. This higher molecular weight enables them to be highly effective when used as wet-strength resins in paper manufacture or when used as water flocculants.

In order to point out more fully the nature of the present invention, the following specific examples are given as illustrative embodiments of the present process and products produced thereby.

EXAMPLE 1

(a) Resin preparation

A quantity of 196 grams maleic anhydride was dissolved in 200 ml. of benzene and added gradually, with good agitation, to a solution of 206 grams diethylene triamine dissolved in 300 ml. of benzene. The addition was carried out slowly over a period of 2 hours in order to maintain the temperature below 35° C. After the addition was complete, the mixture was stirred at high speed for 3 hours in order to break up any pieces of solid adduct which had formed. The adduct was then filtered, washed with 100 ml. of benzene and dried overnight in a vacuum oven. The yield was 350.3 grams of an amine acid organamide compound of the formula:

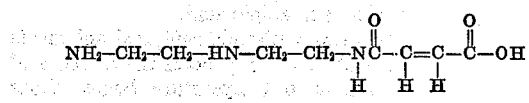

A quantity of 350 grams of the above compound was dissolved in 120 ml. of water and placed in a one liter resin reaction kettle equipped with stirrer, heating mantle, condenser, water trap, vapor, and liquid thermometers. The reaction mixture was then heated for 4 hours and 38 minutes during which time water was distilled off the reaction liquid and the temperature increased from 78° C. to 170° C. The residual product was a polyamino polyamide polymer comprised of units of the formula:

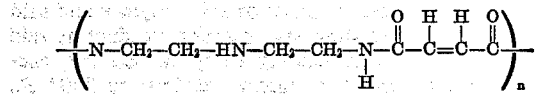

A quantity of 100 grams of a 50% aqueous solution of this polyamino polyamide condensation polymer (viscosity 120 cp. at 25° C.) was added to a one liter resin reaction kettle. The solution was further diluted to 35% polymer and then heated to 65° C. Next, 24 grams of epichlorohydrin were added in two increments over a period of one hundred and eleven minutes. During this time 18.4 grams of a 10% aqueous solution of NaOH were also added to maintain the pH of the reaction mixture about 9.0, and 435.6 grams of water were added in several increments to dilute the reaction mixture to 15% solids. The temperature of the solution was maintained between 46 and 65° C. After 140 minutes of reaction time the reaction mixture was diluted to 10% solids and acidified to a pH of 5.6. The viscosity of the final 10% product was approximately 600 cp. at 25° C. as measured on a Brookfield LVT viscometer at 30 r.p.m. with a No. 2 spindle. The structure of the resulting thermosettable polymer is believed to be:

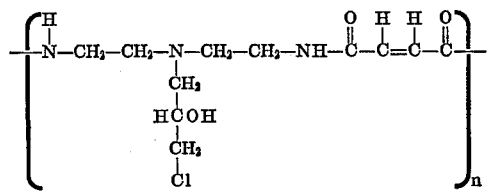

($r$=at least 20).

However, because some of the epichlorohydrin molecules are hydrolyzed before reacting with the backbone polymer chain, there are still a considerable number of crosslinking sites, i.e., residual secondary amino nitrogens, along the polymer chain. These residual amino nitrogens react with the pendant epichlorohydrin-derived groups to form a crosslinked structure believed to be:

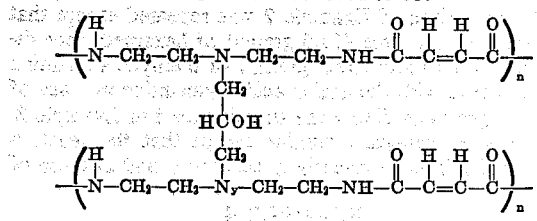

wherein $N_y$ is a secondary amino nitrogen which had remained unreacted with the epichlorohydrin until the crosslinking step.

An infrared analysis of the resin generally confirmed the above-described molecular structure.

(b) Paper treating and testing

Sheets of paper were prepared from bleached kraft softwood pulp having a Canadian Standard Freeness of about 450 in order to evaluate the resin of Example 1 against commercially-successful control resin. Eight-inch-square sheets were prepared according to TAPPI Standard Procedure T456m–49. Following preparation, the sheets were dried for three minutes at about 230° F. on a rotary drum drier and were then cured for one hour at 105° F. Six ½″ strips were then cut from each sheet, with half being tested for dry strength, and the other half being tested for wet strength (after a presoaking for 10 seconds in water).

The wet tensile strengths imparted by the control resin and the product of this invention were measured according to the procedures set forth in D–829–48. The test results are set forth and compared with the dry tensile strength in the following table.

| Resin | Percent resin added based on dry pulp | Average Sheet weight (grams) | Average Dry tensile (lb./in.) | Average Wet tensile (lb./in.) |
| --- | --- | --- | --- | --- |
| None | 0.0 | 1.50 | 7.16 | 0.25 |
| Kymene 557 [1] | 1.0 | 1.52 | 9.78 | 1.27 |
| Example 1 | 1.0 | 1.49 | 7.62 | 1.53 |

[1] A commercial wet-strength resin sold by Hercules Corporation.

It is to be noted that the desired improvement in wet strength was obtained without any significant increase in the dry strength of the paper. This is a useful attribute of the paper for a number of uses. For example, it allows a paper package to be opened as easily when dry as if no resin were present.

EXAMPLE 2

0.40 mole (80.4 grams) of the amine acid organamide of Example 1 were added to 120 ml. of water along with 0.60 mole (87.6 grams) of adipic acid and 0.56 mole (57.7 grams) of diethylene triamine. In a kettle identical to that used in Example 1, the mixture was heated for 3 hours during which time the reflux temperature increased from 100° to 170° C. The resultant polyamino polyamide polymer had a viscosity of 85 cp. at 50% concentration in water 25° C.

50 grams of this polymer were dissolved in 93 grams of water to give a 35% solution. 24 grams of epichlorohydrin were added in two increments over a period of about one hour. As in Example 1, the reaction mixture was maintained at pH 9 by addition of 10% aqueous NaOH and about 400 grams of water were added to dilute the mix to a solids content of 15%. After 2½ hours, the reaction mixture was diluted to 5% and pH adjusted to 5.6 by addition of acid. The viscosity of the final product was 90 cp. at 5% solids, 25° C. and over 100 cp. at 10 %solids, 25° C.

Paper was treated with this resin as in Example 1, part B. The wet tensile strength was considerably lower than that of the materials listed in the table of Example 1.

EXAMPLE 3

The procedure of Example 2 was repeated except that a mixture of 0.1 mole (11.6 grams) of hexamethylene diamine and 0.5 mole (52.5 grams) of diethylene triamine was admixed with the amine acid organamide in place of the 57.7 grams of diethylene triamine used in Example 2. Results were generally similar except that the reaction product displayed unusually good clarity and absence of color.

EXAMPLE 4

The procedure of Example 1 was repeated except that the amine acid organamide was formed from an amine mixture of 46.5 grams hexamethylene diamine and 164.8 grams of diethylene triamine in lieu of the 206 grams of diethylene triamine used in Example 1. The results were similar to those of Example 1.

It is, of course, to be understood that the foregoing example is intended to be illustrative and that numerous changes can be made in the reactants, proportions, and conditions set forth therein without departing from the spirit of the invention as defined in the appended claims.

What is claimed is:

1. A process for making a water-soluble cationic polymer comprising the steps of reacting, in a nonaqueous medium, an acid anhydride of the formula:

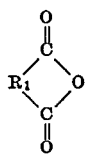

where $R_1$ is an aliphatic ethylenically unsaturated divalent hydrocarbon group,
with an equimolar amount of amine selected from the class consisting of: (a) an alkylene amine of the formula $NH_2(R_2NH)_xH$ where $R_2$ is an alkylene group having from 2 to 4 carbon atoms and $x$ is an integer from 2 to 6; and (b) a mixture of alkylene amine (a) with an alkylene amine of the formula $NH_2R_3NH_2$, in which $R_3$ is an alkylene group having from 2 to 6 carbon atoms in which mixture at least 20% of the total amino groups are secondary amino groups, to form an amine acid organamide selected from the group consisting of

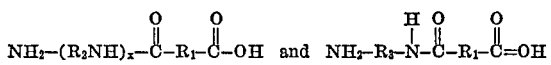

providing a mixture of monomers consisting essentially of said amine acid organamide, and the remainder of an alkylene amine of the formula $NH_2—R_3—NH_2$ and adipic acid, the molar proportion of said amine acid organamide and of the last said amine and acid being approximately 2:3:3 respectively,
polymerizing said mixture at a temperature below about 170° C., said molar proportion of amine acid organ-
amide being sufficient to provide a condensation polymer of which at least 25% by weight of the repeating units are from the amine acid organamide.
reacting residual secondary amino groups on the polymer so formed with from 0.5 to 2.0 moles of epichlorohydrin per mole of secondary amino groups until the viscosity of the resultant product, in 10% aqueous solution, is between about 100 and about 2000 cps.

2. The process of claim 1 wherein $NH_2(R_2NH)_xH$ is diethylene triamine.

3. The process of claim 1 wherein said acid anhydride is maleic anhydride.

4. The process of claim 2 wherein said acid anhydride is maleic anhydride, and the remainder of said mixture of monomers consists essentially of diethylene triamine and adipic acid.

5. The process of claim 2 wherein said acid anhydride is maleic anhydride, and the remainder of said mixture of monomers consists essentially of diethylene triamine, hexamethylene diamine, and adipic acid.

6. The process of claim 2 wherein said acid anhydride is maleic anhydride and in which process the amine acid organamide is formed at a temperature below about 35° C.

7. The process of claim 4 wherein $R_1$ has up to about 8 carbon atoms.

8. The process of claim 7 wherein up to about one mole of epihalohydrin per mole of residual secondary amino groups is reacted with said secondary amino groups in an aqueous medium whereby the amount of epihalohydrin is insufficient to react with all said secondary amino groups of said polymer thereby leaving some said secondary amino groups as sites for crosslinking reactions.

9. The process of claim 8 including the subsequent step of heating the reaction product of said polymer and said epihalohydrin to crosslink said reaction product at said cross-linking sites, said heating being carried out, successively, for at least two minutes at 180° to 300° F., and at least 30 minutes at 80° to 130° F.

10. The water-soluble cationic polymer consisting essentially of the polymeric condensation product of polyalkylene polyamine, alkylene diamine, ethylenically unsaturated aliphatic dicarboxylic acid anhydride and adipic acid formed by the process of claim 1.

References Cited

UNITED STATES PATENTS

| | | | |
|---|---|---|---|
| 2,174,619 | 10/1939 | Carothers | 260—78 UA |
| 3,125,552 | 3/1964 | Loshaek et al. | 260—78 UA |
| 3,239,491 | 3/1966 | Tsou et al. | 260—78 UA |

HAROLD D. ANDERSON, Primary Examiner

U.S. Cl. X.R.

117—155 R; 162—164, 168; 210—54; 260—29.2 N, 78 UA, 78 TF